United States Patent [19]

Hazeyama

[11] Patent Number: 5,080,847
[45] Date of Patent: Jan. 14, 1992

[54] MANUFACTURING METHOD OF FILTER ELEMENT FOR DUST COLLECTOR

[75] Inventor: Takeshi Hazeyama, Mitaka, Japan

[73] Assignee: Nittetsu Mining Co., Ltd., Tokyo, Japan

[21] Appl. No.: 494,052

[22] Filed: Mar. 15, 1990

[30] Foreign Application Priority Data

Apr. 20, 1989 [JP] Japan .................................. 1-98899

[51] Int. Cl.$^5$ ............................................. B29C 67/04
[52] U.S. Cl. ............................... 264/112; 55/DIG. 5; 264/115; 264/122; 264/126; 264/DIG. 48
[58] Field of Search ............... 264/115, 122, 126, 112, 264/113, 131, DIG. 48; 427/180; 55/DIG. 5

[56] References Cited

U.S. PATENT DOCUMENTS 3,954,932  5/1976  Coale .................................. 264/126

FOREIGN PATENT DOCUMENTS

| 682813 | 3/1964 | Canada | 264/126 |
| 25468 | 7/1976 | Japan | 264/115 |
| 165045 | 7/1986 | Japan | 427/180 |
| 61-502381 | 10/1986 | Japan . | |
| 242639 | 9/1989 | Japan | 264/126 |
| 80651 | 3/1990 | Japan | 264/115 |
| 2017529A | 10/1979 | United Kingdom . | |

OTHER PUBLICATIONS

Abstract of Japanese Publication 01-5934.

Primary Examiner—Mary Lynn Theisen
Attorney, Agent, or Firm—Jordan and Hamburg

[57] ABSTRACT

A method of manufacturing a filter element comprises the steps of mechanically crushing two grades or more of a heat resistive synthetic resin material, the grades having different melt flow indices, respectively, the heat resistive synthetic resin material being selected from the group consisting of polysulfone, polyethersulfone and polyphenylenesulfide or containing said selected heat resistive synthetic resin as a main constituent, mixing them with one grade of them being 20 to 80 wt %, sintering the mixture in a metal mold at a melt temperature thereof plus or minus 10° C. when the mixture is crystalline resin or at a temperature in a range from glass transition temperature thereof up to the glass transition temperature plus 40° C. when the mixture is non-crystalline resin to form a shaped product having intercommunicating porosity, spraying surfaces of the shaped product with a mixture in liquid suspension of polytetrafluoroethylene particles, adhesive comprising thermosetting synthetic resin, and water and solidifying the suspension by heating. In order to improve the wetting of polytetrafluoroethylene with water, ethyl alcohol may be added to the suspension medium.

3 Claims, 2 Drawing Sheets

MANUFACTURING METHOD OF FILTER ELEMENT FOR DUST COLLECTOR

BACKGROUND OF THE INVENTION

The present invention relates to a method of manufacturing a filter element for use in a dust collector such as those used in, for example, a factory for separating particles contained in gas kept at a temperature from room temperature up to 160° C., for collecting powder products or environmental safety or used to remove dust contained in exhaust gas of a drier, a boiler or an incinerator.

A filter bag made by sewing a filter cloth or a filter element such as sintered plastic material having intercommunicating porosity has been used for collecting dust particles produced in a factory for product collection or dust removal. As the porous plastic filter element having been produced by sintering synthetic resin particles, a self-supporting member produced by sintering polyethylene particles, polypropylene particles or a mixture of these particles is disclosed in Japanese Patent Gazette 5934/1989 and the same member coated with adhesive containing tetrafluoroethylene is disclosed in Japanese Patent Application Laid Open No. 502381/1986.

On the other hand, for collection of dust contained in exhaust gas of a drier, a boiler or an incinerator, a dust collector or an electric dust collector using a filter element has been used widely, a heat durable filter cloth of glass fiber or heat resistive synthetic resin fiber or a sintered ceramic filter when gas temperature exceeds 300° C. being incorporated in the filter element.

It has been known, however, that, although the sintered porous synthetic resin material filter bag or filter element is effective at around room temperature, it is easily deformed and thereby rendered unsuitable for normal use at a temperature above about 70° C.

The filter bag incorporating glass fiber or heat resistive synthetic resin fiber cloth has been used to separate particles from gas at a temperature of 160° C. or lower. However, since texture thereof is usually rough, there may be leakage of dust therethrough or, when a felt cloth made of such fiber is used, the felt cloth may be clogged gradually with dust particles layered thereon, causing flow resistance of air therethrough to be increased which means that a higher power is required for a blower. Further, in the case of filter bag, pressurized air is supplied intermittently in an opposite direction to dust containing gas flow to blow away particles accumulated on the filter surface. This causes friction between an insert for the bag for maintaining the shape thereof and the filter cloth to occur, frequently damaging the latter.

When, in order to separate particles from gas at 160° C. or lower, a dust collector using the sintered ceramic filter member or an electric dust collector is used, the cost thereof becomes high, as the sintered ceramic filter member or the eletric dust collector itself is expensive.

SUMMARY OF THE INVENTION

An object of the present invention is to provide a method of manufacturing a filter element which is free from the above mentioned problems.

According to the present invention, the above object is achieved by providing a method comprising the steps of mechanically crushing two grades or more of a heat resistive synthetic resin material, the grades having different melt flow indices, respectively, the heat resistive synthetic resin material being selected from the group consisting of polysulfone, polyethersulfone, polyphenylenesulfide, and resins containing polysulfone, polyethersulfone or polyphenylenesulfide as the main constituent, mixing them such that one grade of them is 20 to 80 wt %, sintering the mixture in a metal mold at the melt temperature thereof plus or minus 10° C. when the mixture is crystalline resin or at a temperature in a range from the glass transition temperature thereof up to the glass transition temperature plus 40° C. when the mixture is non-crystalline resin to form a shaped product having intercommunicating porosity, spraying a surface of the shaped product with a liquid suspension constituted of a mixture of polytetrafluoroethylene particles, adhesive constituted of thermosetting synthetic resin and water and solidifying the suspension by heating.

Preferably, the mechanical crushing step is performed such that angle of repose and bulk density (apparent density) of the heat resistive synthetic resin becomes 25° to 40° and 0.4 g/cm$^3$ to 0.6 g/cm$^3$, respectively.

Preferably, the liquid suspension is a mixture of polytetrafluoroethylene particles, adhesive of thermosetting synthetic resin, water and ethylalcohol.

The shaped product having intercommunicating porosity may be cylindrical, box shaped or any other shape and may have corrugated surfaces to increase the outer surface area. The shaped product may be formed by filling the metal mold with the heat resistive synthetic resin particles with vibration and sintering them without pressure.

As the heat resistive synthetic resin, thermosetting resin such as phenol resin is not suitable since a shaped product made by sintering such a resin in a mold is too fragile to be flexed. When the material is a thermoplastic crystalline resin, the melting point thereof should be 160° C. or higher. For non-crystalline thermoplastic resin having no defined melting point, the glass transition temperature thereof should be 160° C. or higher. There are a plurality of grades of each heat resistive synthetic resin, the grades having melt flow indices different from each other. According to the invention, a combination of two or more grades of the heat resistive synthetic resin, preferably a thermoplastic resin, is desirable, the grades having different melt flow indices which are small enough. The heat resistive synthetic resin may be one selected from the group consisting of polysulfone, polyethersulfone and polyphenylenesulfide. Alternatively, a material including the selected one as a main constituent and other resins an amount of which is selected such that mutual solubility is not degraded may be used for this purpose. It should be noted that polysulfone and polyethersulfone are non-crystalline and polyphenylenesulfide is crystalline.

Particle size of the heat resistive synthetic resin should be smaller than 500 μm and, preferably, smaller than 300 μm. The heat resistive synthetic resin may be in the form of powder the particles of which are of a size larger than 500 μm or pellets of 2 to 3 mm when it is crystalline resin. In a case of non-crystalline resin, it is available commercially in pellet form having size of 2 to 3 mm. The heat resistive synthetic resin to be used to produce the present shaped product is mechanically crushed so that particle size thereof decreases to the above mentioned range of size. Heat resistive synthetic resin pellet is usually crushed into particles by mechanical shock and/or shearing force given by a crushing machine. Since, in such case, particle shape is variable and has fibre-like protrusions, it is difficult to fill a metal mold uniformly with particles. The inventor of this invention has found that there is a correlation between the uniformity of particle filling and the characteristics of heat resistive synthetic resin particles, angle of repose and bulk density. The correlation is shown in Table 1 below.

TABLE 1

| angle of repose (deg.) | 35–50 | 35–45 | 25–40 |
|---|---|---|---|
| bulk density (g/cm$^3$) | 0.2–0.4 | 0.3–0.45 | 0.4–0.6 |
| particle shape | fibre major various | fibre minor spherical | fibre little sphere |
| uniformity of filling | bad | not bad | good |

As shown in the Table 1, the best result is obtained when heat resistive synthetic resin is crushed into particles with angle of repose in a range from 25° to 40°, preferably range from 25° to 35°, bulk density in a range from 0.4 g/cm$^3$ to 0.6 g/cm$^3$. Incidentally, angle of repose and bulk density of particles can be measured by means of a commercially available measuring machine.

Particles of at least two grades of a heat resistive synthetic resin prepared by crushing the resin material so as to have the above mentioned characteristics are uniformly mixed in a mixer. The mixer to be used and mixing time are not important. However, a mixing ratio of at least two grades of the heat resistive synthetic resin should be determined such that one of two grades is 20 to 80 weight %. This is because, when a shaped filter is formed by sintering a heat resistive synthetic resin particle mixture containing a grade whose melt flow index is larger than the other grade in a ratio of 80 wt % or more, the filter includes a considerable proportion of melted resin, so that the proportion of the filter having intercommunicating porosity becomes too small. Further, in such case, there may shrinkage of the resultant product, which is not suitable for a shaped filter according to the invention.

The shaped product of the present invention may be in the form of a cylinder or box having flat surfaces or corrugated surfaces as mentioned previously. In order to realize such shape, the mixture of at least two grades of heat resistive synthetic resin particles whose angle of repose and bulk density are regulated as mentioned previously is filled into a metal mold having molding surfaces shaped to provide any of the above mentioned forms while vibrating the mold and then sintered. Amplitude and frequency of vibration are not important.

The sintering may be perfomed by putting the metal mold in an electric drier, an electric furnace or a heater whose temperature can be regulated by regulating fuel supplied thereto. Alternatively, it is possible to use a metal mold associated with a heat source, heating medium being circulated therebetween to heat the mold.

Whatever the means sintering should be done such that the temperature of the mixture in the metal mold is kept at the melt temperature thereof plus or minus 10° C. when the mixture is crystalline resin or at a temperature in a range from glass transition temperature thereof up to this temperature plus 40° C. when the mixture is non-crystalline resin. If the sintering temperature is lower than either of the above mentioned temperatures, it is impossible to obtain a product having an acceptable mechanical strength. If the temperature is higher than either of these temperatures, heat, resistive resin particles are melted together, reducing the proportion of the product having intercommunicating porosity.

The sintered product should be removed from the metal mold after its temperature becomes 100° C. or lower.

There are many intercommunicating pores in the surfaces of the sintered product. Since the size of such pores is relatively large, the product is coated with a surface coating layer containing particles whose size is smaller than the pore size to fill the pores with such small particles to thereby reduce the pore size. The coating layer is provided by spraying a liquid suspension containing polytetrafluoroethylene particles, adhesive comprising thermosetting synthetic resin and water onto the surfaces of the product and heating the latter to solidify the suspension.

Polytetrafluoroethylene particles serve to reduce the pore size such that the pores do not become clogged up with dust particles to be collected and to facilitate a blowing away of dust particles accumulated on the filter element. Preferably, the polytetrafluoroethylene particles are low molecular weight of average particle size of 3 to 10 μm, which is commercially available.

Since the filter element is used at 160° C. or lower, the adhesive should be an aqueous adhesive containing thermosetting synthetic resin durable for such temperature. As thermosetting synthetic resin, epoxy resin, phenol resin, amino resin, polyurethane or unsaturated polyester resin may be used.

In providing the surface coating layer by spraying the suspension and thermosetting the suspended resin adhesive, the surface coating layer is formed by fixing polytetrafluoroethylene particles by means of thermosetting of the resin adhesive. In order to facilitate the wetting of polytetrafluoroethylene with water it is advisable to add ethylalcohol to the suspension medium since polytetrafluoroethylene is hardly wetted with water. In such case, it has been found that the best result is obtained with the ratio of polytetrafluoroethylene, adhesive, water and ethylalcohol of 5:0.1 to 5:10 to 50:1 to 5.

DETAILED DESCRIPTION OF THE PREFERRED EMBODIMENT

According to the present invention, two grades of heat resistive synthetic resin, polysulfone having glass transition temperature 190° C., were used, the two grades having different melt flow indices. The two grades were crushed such that one grade has angle of repose of 34° and bulk density of 0.49 g/cm$^3$ and the other grade has angle of repose of 31° and bulk density of 0.46 g/cm$^3$. The two were mixed with mixing ratio 2:3 and the mixture was filled into a metal mold while the mold was vibrating. The metal mold was closed and inserted into an electric drier. The drier was heated such that air temperature therein becomes 230° C. and the heating was terminated when resin temperature in the metal mold becomes 220° C. Then the metal mold was removed from the electric drier and a shaped product was removed from the metal mold after its temperature became 100° C. or lower.

Surfaces of the shaped product were sprayed with liquid suspension containing 5 parts of polytetrafluoroethylene, 1 part of aqueous adhesive, 13 parts of water and 1 part of ethylalcohol. Then, the shaped product was heated in the electric dryer regulated to 180° C. for 30 minutes to harden the adhesive and a filter element was obtained.

Figure 1:
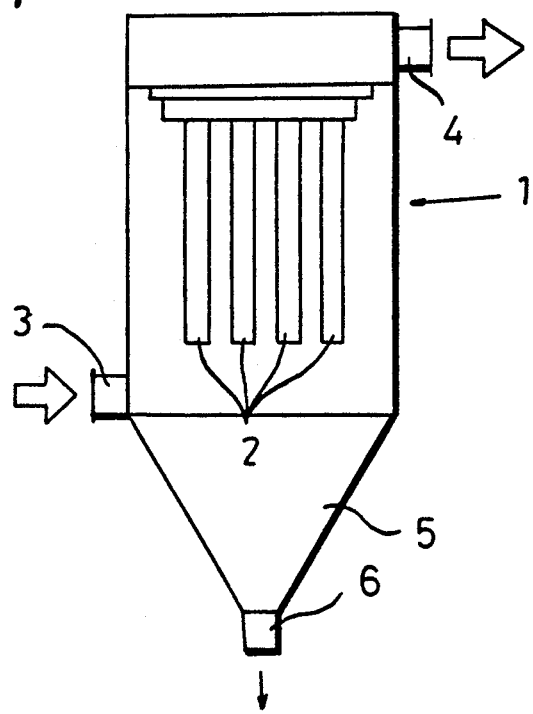
FIG. 1 shows schematically a construction of a dust collector according to an embodiment of the present invention.

In FIG. 1, a plurality of the filter elements 2 manufactured as mentioned above are arranged in a dust collector 1. Gas containing dust is introduced through an inlet 3 of the dust collector 1 thereinto and gas from which dust has been removed flows out from an outlet 4. Dust thus removed is collected in a hopper 5 and discharged through a discharge port 6.

Figure 2:
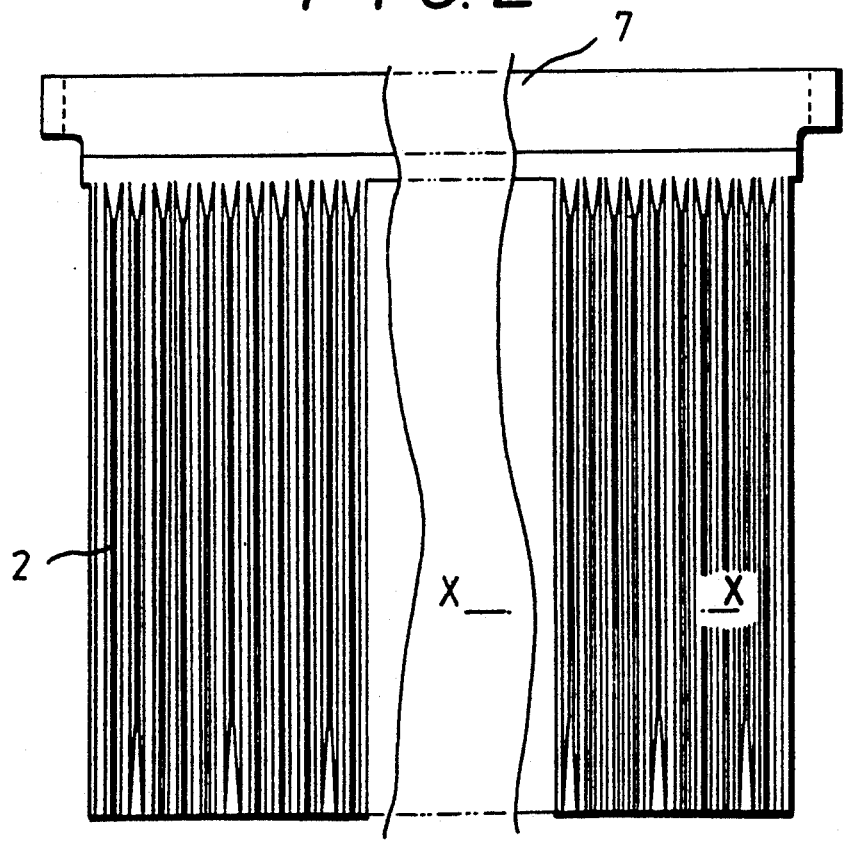
FIG. 2 is a front view of a filter element to be used in the dust collector shown in FIG. 1.
Figure 3:
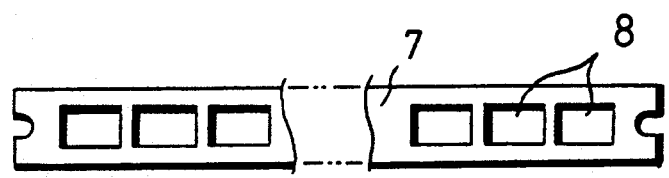
FIG. 3 is a top view of the filter element of FIG. 2.
Figure 4:
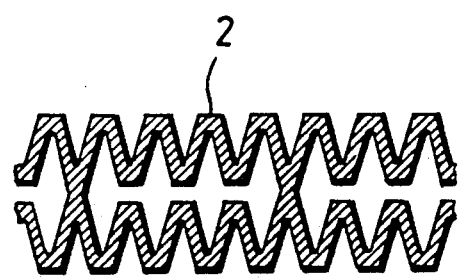
FIG. 4 is a cross section taken along a line X—X in FIG. 2.

A detail of each filter element 2 is shown in FIG. 2. The filter element 2 may have a corrugated cross section such as shown in FIG. 4 although any other cross sections may be employed with similar effect. The filter elements 2 are fixed to a head portion 7 having through-holes 8 connected to the outlet port 4, as shown in FIG. 3, so that upwardly moving gas whose dust is removed by these filter elements 2 passes through the through-holes 8 to the outlet port 4.

Air at 160° C. and containing 20 g/m$^3$ of fine particles (average size of 13 μm) of limestone was introduced into the dust collector mentioned above at a flow rate of 1 m/min for 29 hours continuously. During this time period, compressed air was supplied at a pressure of 5 kg/cm$^2$ intermittently in the opposite direction for 0.05 seconds with intervals of 30 seconds to remove limestone particles accumulated on the surfaces of the filter elements. Dust density of air passed through the filter elements was about 0.45 mg/m$^3$ and pressure drop was about 250 mmAq, showing a good dust collection. During this experiment, there was no trouble such as damage of filter elements.

It has been found that the filter element according to the present invention is not deformed and maintains its self-supporting structure in a temperature range from room temperature up to 160° C. The removal of dust particles accumulated on the surfaces of the filter element is easy without clogging of and without damage to the filter element by the intermittent application of relatively high pressure air.

What is claimed is:

1. A method of manufacturing a filter element for use in a dust collector for separating particles contained in gas in a temperature range from room temperature up to 160° C. comprising the steps of:

mechanically crushing two grades or more of a heat resistive synthetic resin material, said grades having different melt flow indices, respectively, said heat resistive synthetic resin material being selected from the group consisting of polysulfone, polyethersulfone, polyphenylenesulfide and resins containing polysulfone, polyethersulfone or polyphenylenesulfide as the main constituent, polysulfone and polyethersulfone being non-crystalline and polyphenylenesulfide being crystalline;

mixing them with one of said grades being 20 to 80 wt %;

sintering the mixture in a metal mold at a melt temperature thereof plus or minus 10° C. when the mixture is crystalline resin or at a temperature in a range from glass transition temperature thereof up to said glass transition temperature plus 40° C. when the mixture is non-crystalline resin to form a shaped product having intercommunicating porosity;

spraying surfaces of the shaped product with a liquid suspension comprising polytetrafluoroethylene particles, adhesive comprising thermosetting synthetic resin, and water; and solidifying the suspension by heating.

2. The method claimed in claim 1, wherein said crushing step is performed such that angle of repose and bulk density of said heat resistive synthetic resin are 25° to 40° and 0.4 g/cm$^3$ to 0.6 g/cm$^3$, respectively.

3. The method claimed in claim 1, wherein ethylalcohol is added to said suspended mixture liquid.

* * * * *